(12) United States Patent
Terada et al.

(10) Patent No.: US 10,189,504 B2
(45) Date of Patent: Jan. 29, 2019

(54) VEHICLE PILLAR STRUCTURE

(71) Applicant: TOYOTA JIDOSHA KABUSHIKI KAISHA, Toyota-shi, Aichi-ken (JP)

(72) Inventors: Shin Terada, Toyota (JP); Atsushi Mikuni, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/424,393

(22) Filed: Feb. 3, 2017

(65) Prior Publication Data

US 2017/0240211 A1 Aug. 24, 2017

(30) Foreign Application Priority Data

Feb. 24, 2016 (JP) .................................. 2016-033252

(51) Int. Cl.
| | |
|---|---|
| *B60J 1/00* | (2006.01) |
| *B62D 25/04* | (2006.01) |
| *B62D 27/02* | (2006.01) |
| *B62D 29/00* | (2006.01) |

(52) U.S. Cl.
CPC .............. *B62D 25/04* (2013.01); *B60J 1/006* (2013.01); *B62D 27/02* (2013.01); *B62D 27/026* (2013.01); *B62D 29/005* (2013.01)

(58) Field of Classification Search
CPC ...... B62D 25/04; B62D 25/06; B62D 25/025; B62D 25/082; B62D 21/157; B62D 27/023; B62D 25/02; B60J 10/84; B60J 1/006; B60J 1/007; B60J 1/2016; B60J 1/2025; B60J 1/2044; B60J 1/2047; B60J 1/2052

USPC .... 296/193.06, 193.05, 193.01, 203.03, 210, 296/187.09, 187.1, 191; 29/897.2, 428, 29/401.1, 469.5, 525.11, 592.1; 72/364, 72/368, 370.1
See application file for complete search history.

(56) References Cited

U.S. PATENT DOCUMENTS

| | | | | |
|---|---|---|---|---|
| 4,552,400 A | * | 11/1985 | Harasaki .............. | B62D 25/025 296/203.03 |
| 5,046,778 A | * | 9/1991 | Larsen ................... | B60J 5/0402 296/146.5 |
| 5,102,188 A | * | 4/1992 | Yamane ................ | B29C 44/188 296/187.02 |

(Continued)

FOREIGN PATENT DOCUMENTS

| | | |
|---|---|---|
| JP | 2001-26283 A | 1/2001 |
| JP | 2004-155942 A | 6/2004 |

(Continued)

*Primary Examiner* — D Glenn Dayoan
*Assistant Examiner* — Sunsurraye Westbrook
(74) *Attorney, Agent, or Firm* — Hauptman Ham, LLP

(57) ABSTRACT

A vehicle pillar structure includes a pillar upper portion that extends along a vehicle height direction on a vehicle width direction outer side and is made of a transparent resin, and a pillar lower portion that is disposed on a the vehicle height direction lower side of the pillar upper portion, is made of metal, and is joined to the pillar upper portion at a joint portion. The joint portion between the pillar upper portion and the pillar lower portion includes an outer joint portion positioned on the vehicle width direction outer side, and an inner joint portion positioned on a vehicle width direction inner side. A height of the outer joint portion and a height of the inner joint portion are different.

20 Claims, 9 Drawing Sheets

(56) References Cited

U.S. PATENT DOCUMENTS

| | | | | |
|---|---|---|---|---|
| 6,474,726 B1* | 11/2002 | Hanakawa | ............ | B62D 25/04 |
| | | | | 296/187.12 |
| 6,619,729 B2* | 9/2003 | Kimura et al. | ........ | B60J 5/0477 |
| | | | | 296/203.01 |
| 2007/0102964 A1* | 5/2007 | Yoshimoto | ............ | B60J 5/0425 |
| | | | | 296/187.12 |
| 2011/0233970 A1* | 9/2011 | Nagai | .................... | B62D 25/02 |
| | | | | 296/203.03 |
| 2014/0319877 A1* | 10/2014 | Hida | ...................... | B62D 25/02 |
| | | | | 296/191 |
| 2017/0183039 A1 | 6/2017 | Toyota et al. | | |

FOREIGN PATENT DOCUMENTS

| | | |
|---|---|---|
| JP | 2011-088495 A | 5/2011 |
| JP | 2017-114410 A | 6/2017 |
| WO | 2015/025572 A1 | 2/2015 |

\* cited by examiner

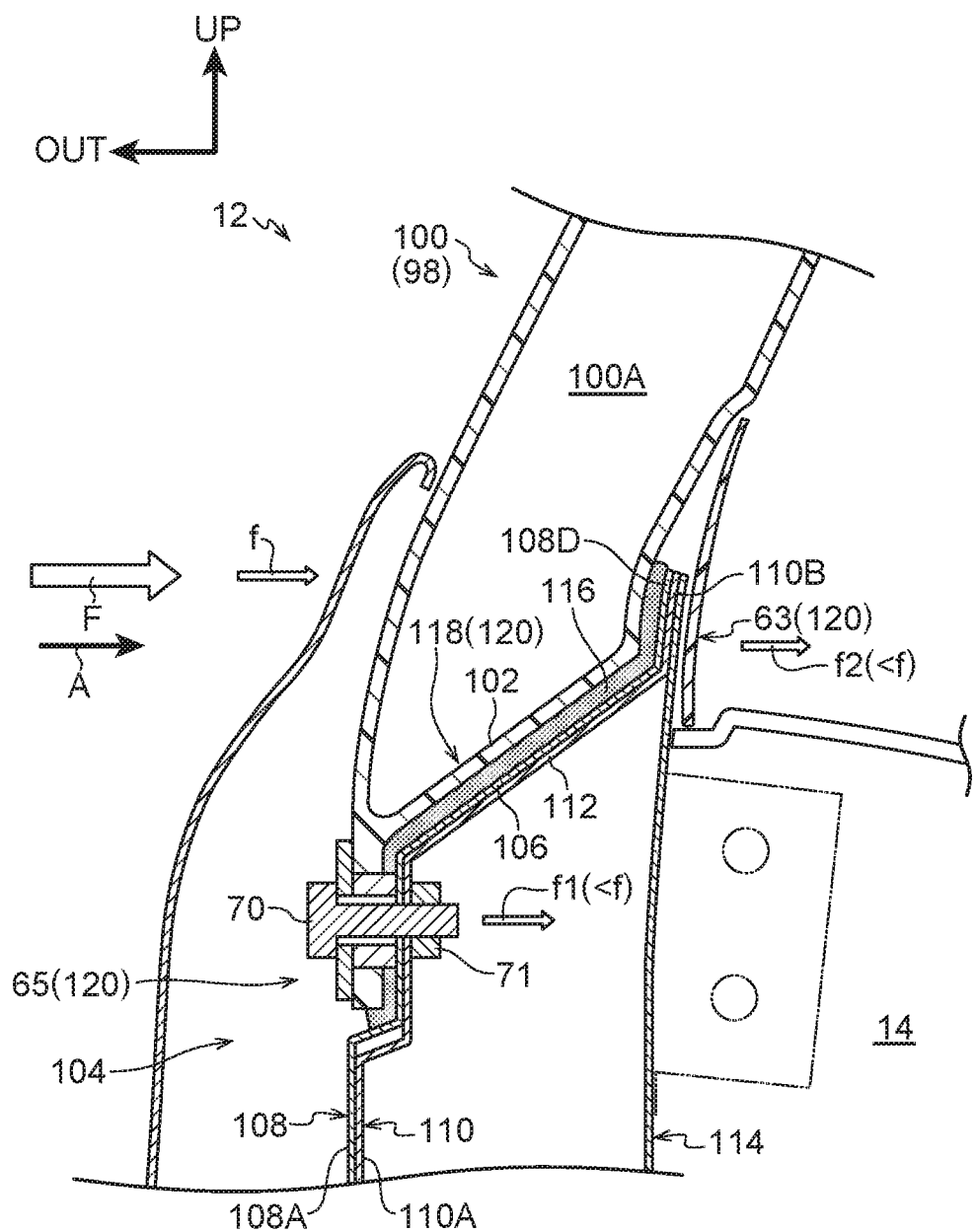

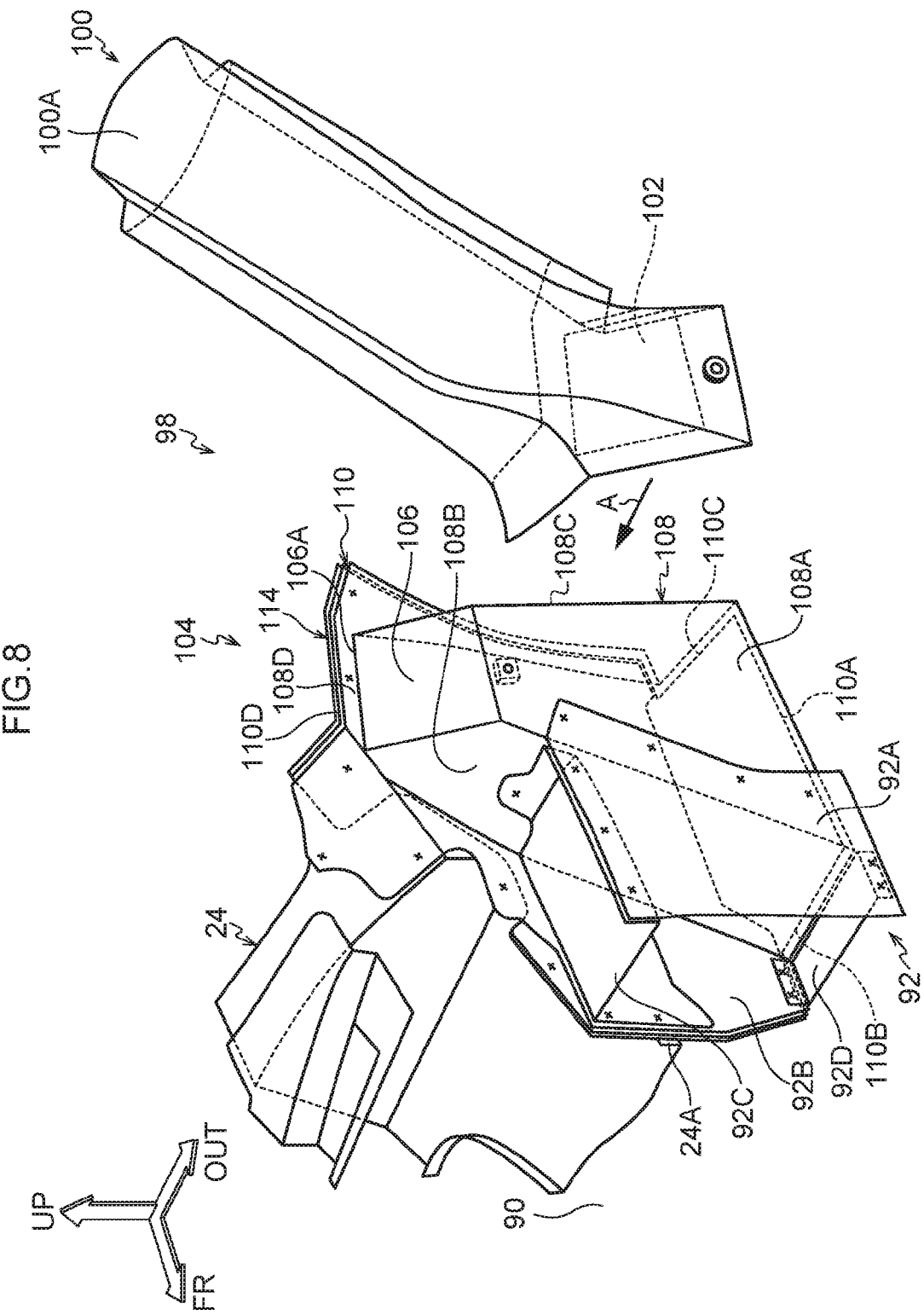

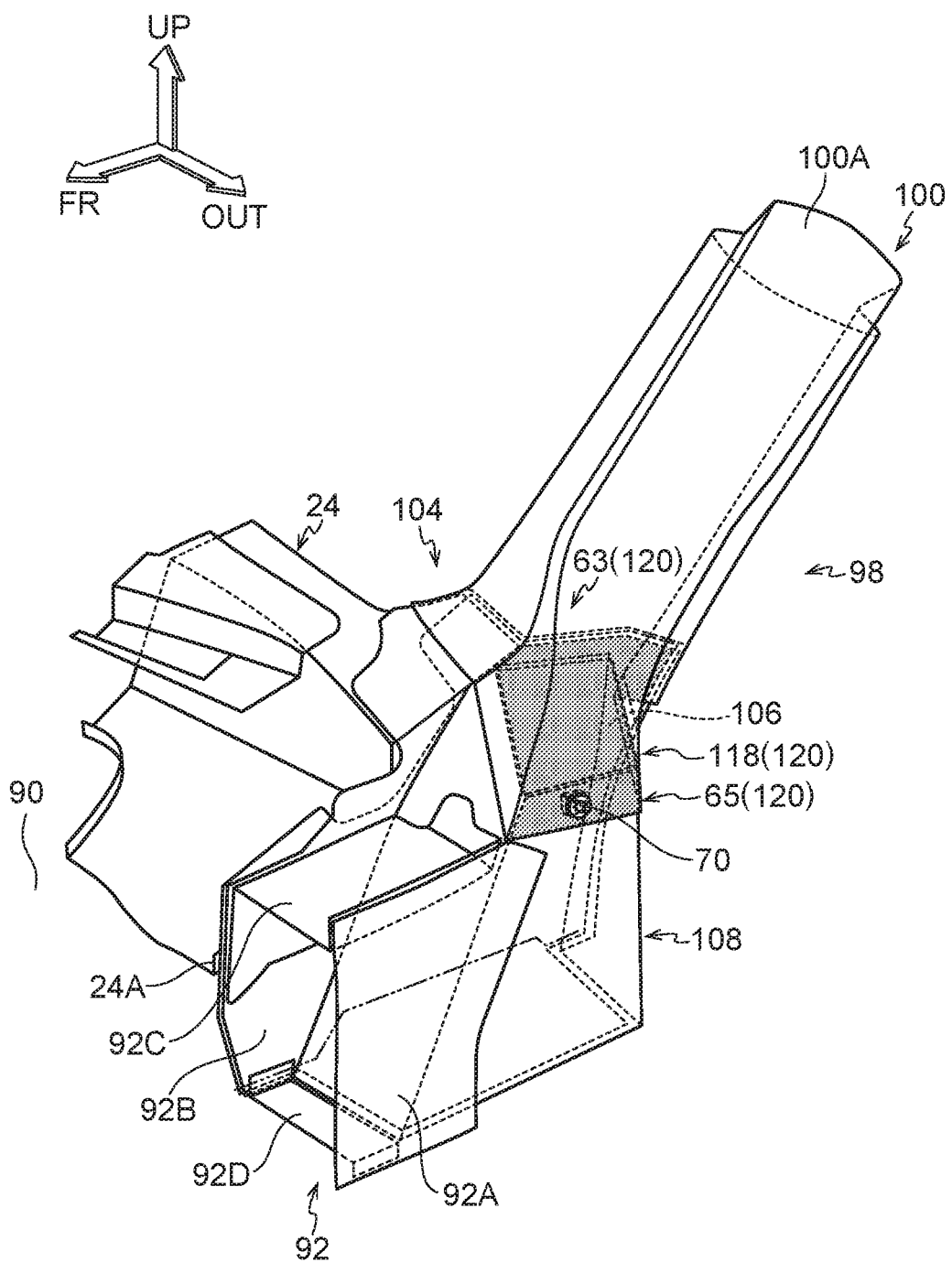

VEHICLE PILLAR STRUCTURE

CROSS-REFERENCE TO RELATED APPLICATION

This application is based on and claims priority under 35 USC 119 from Japanese Patent Application No. 2016-033252 filed on Feb. 24, 2016, the disclosure of which is incorporated by reference herein.

BACKGROUND

Technical Field

The present disclosure relates to a vehicle pillar structure.

Related Art

Japanese Patent Application Laid-open (JP-A) No. 2011-88495 describes a vehicle body structure where a vehicle body upper portion integrally molded of resin and a vehicle body lower portion made of metal are joined to each other. In this related art, pillars configured as parts demarcating the cabin of the vehicle (vehicle body) are each divided into an upper portion and a lower portion in the vehicle height direction. The lower end portions of the pillar upper portions formed on the vehicle body upper portion side are insertable into open portions formed in the upper end portions of the pillar lower portions formed on the vehicle body lower portion side.

In each open portion is formed a horizontal support portion that is formed along the substantially horizontal direction and closes off the upper end portion of the pillar lower portion. The lower end portion of the pillar upper portion abuts against the horizontal support portion, and thus the pillar upper portion is positioned in the vehicle height direction. Here, an adhesive is applied to the upper end portion of the pillar lower portion, and the lower end portion of the pillar upper portion is adhered (joined) via the adhesive to the upper end portion of the pillar lower portion.

As mentioned above, in the related art, the pillar upper portion is made of resin and the pillar lower portion is made of metal. By making the materials of the pillar upper portion and the pillar lower portion different in this way, a balance is achieved between ensuring that the pillar is strong and rigid and reducing the weight of the pillar.

In this connection, when the pillar upper portion is made of resin, the ability of the driver to see things outside the vehicle (hereinafter "the ability to see outside the vehicle" for simplicity) can be enhanced if the pillar upper portion is made of a transparent resin.

SUMMARY

A vehicle pillar structure comprises a pillar upper portion that extends along a vehicle height direction on a vehicle width direction outer side and is made of a transparent resin, and a pillar lower portion that is disposed on a the vehicle height direction lower side of the pillar upper portion, is made of metal, and is joined to the pillar upper portion at a joint portion. The joint portion between the pillar upper portion and the pillar lower portion includes an outer joint portion positioned on the vehicle width direction outer side, and an inner joint portion positioned on a vehicle width direction inner side. A height of the outer joint portion and a height of the inner joint portion are different.

A vehicle pillar structure comprises a pillar upper portion that extends along a vehicle height direction on a vehicle width direction outer side and is made of a transparent material, and a pillar lower portion that is disposed on a the vehicle height direction lower side of the pillar upper portion and is joined to the pillar upper portion at a joint portion. The joint portion between the pillar upper portion and the pillar lower portion includes an outer joint portion positioned on the vehicle width direction outer side, and an inner joint portion positioned on a vehicle width direction inner side. A height of the outer joint portion and a height of the inner joint portion are different.

In the vehicle pillar structure of the first aspect of the disclosure, the pillar upper portion extending along the vehicle vertical direction on the vehicle width direction outer side is made of a transparent resin. The pillar lower portion made of metal is disposed on the vehicle vertical direction lower side of the pillar upper portion. The pillar upper portion is joined to the pillar lower portion. In the present disclosure, the ability to see outside vehicle beyond the pillar upper portion can be enhanced as a result of the pillar upper portion being made of a transparent resin. It should be noted in regard to the pillar upper portion in the present disclosure that "made of a transparent resin" includes a case where the entire pillar upper portion is made of a transparent resin and a case where part of the pillar upper portion is made of another member that is colored.

Furthermore, in the present disclosure, in the joint portion between the pillar upper portion and the pillar lower portion, the height of the outer joint portion positioned on the vehicle width direction outer side and the height of the inner joint portion positioned on the vehicle width direction inner side are different. For this reason, the impact load input to the vehicle side portion at the time of a side impact to the vehicle is divided between the outer joint portion and the inner joint portion and transmitted. That is to say, the translational force resulting from the impact load input to the pillar upper portion is dispersed into an upper and lower pair of translational forces resulting from the load transmitted from the outer joint portion to the pillar lower portion and the load transmitted from the inner joint portion to the pillar lower portion, and these translational forces act on the joint portion between the pillar upper portion and the pillar lower portion. Consequently, the translational force acting on the outer joint portion and the translational force acting on the inner joint portion are each smaller than the translational force input to the pillar upper portion at the time of the side impact to the vehicle. Thus, it suffices for the outer joint portion and the inner joint portion to be strong and rigid enough to be able to withstand the translational forces acting on them, so the strength and rigidity needed at the time of a side impact to the vehicle can be efficiently obtained in the joint portion between the pillar upper portion and the pillar lower portion.

A vehicle pillar structure of a second aspect of the disclosure is the first aspect, wherein the pillar upper portion is equipped with a pillar upper portion body and a flange portion extending downward from a vehicle vertical direction lower end of the pillar upper portion body, the pillar upper portion body is joined to the pillar lower portion at the inner joint portion, and the flange portion is joined to the pillar lower portion at the outer joint portion.

In the vehicle pillar structure of the second aspect of the disclosure, the pillar upper portion is equipped with the pillar upper portion body and the flange portion, and the flange portion extends downward from the vehicle vertical direction lower end of the pillar upper portion body. Additionally, the pillar upper portion body is joined to the pillar lower portion at the inner joint portion, and the flange portion is joined to the pillar lower portion at the outer joint portion.

That is, in the present disclosure, in the joint portion between the pillar upper portion and the pillar lower portion, the inner joint portion positioned on the vehicle width direction inner side is placed higher in the vehicle vertical direction than the outer joint portion positioned on the vehicle width direction outer side. For this reason, even when the pillar upper portion is moved from outside in the vehicle width direction inward relative to the pillar lower portion during the assembly of the vehicle, it can be ensured that the pillar upper portion does not interfere with the joint portion of the pillar lower portion as the pillar upper portion reaches the joint portion on the pillar lower portion side (on the trajectory). Consequently, when joining the joint portion on the pillar upper portion side to the joint portion on the pillar lower portion side, the pillar upper portion can be joined to the pillar lower portion from outside in the vehicle width direction inward.

By contrast, for example, if the pillar upper portion were joined to (fitted into) the pillar lower portion from above in the vehicle vertical direction downward, the pillar upper portion would slide along the vehicle vertical direction on the joint portion on the pillar lower portion side. So if, for example, the pillar upper portion were joined to the pillar lower portion via an adhesive, the adhesive applied to the joint portion on the pillar lower portion side would be scraped away by the pillar upper portion. As a result, the amount of adhesive remaining on the joint portion would decrease and the joint strength between the pillar upper portion and the pillar lower portion would be reduced.

However, in the present disclosure, when joining the pillar upper portion to the pillar lower portion, the pillar upper portion can be joined to the pillar lower portion from outside in the vehicle width direction inward. In this way, owing to the movement of the pillar upper portion it is ensured that the pillar upper portion does not interfere with the joint portion on the pillar lower portion side, and thus sliding of the pillar upper portion on the joint portion on the pillar lower portion side is controlled. Because of this, the adhesive applied to the joint portion on the pillar lower portion side can be kept from being scraped away by the pillar upper portion during the assembly of the vehicle.

Moreover, the flange portion is joined to the pillar lower portion at the outer joint portion, so regardless of the shape of the vehicle vertical direction lower portion of the pillar upper portion—and particularly the shape of the lower end portion—the surface area (joint surface area) needed to join the pillar upper portion and the pillar lower portion to each other can be ensured by the flange portion.

A vehicle pillar structure of a third aspect of the disclosure is the first or second aspect, wherein the pillar upper portion is hollow, and a bottom portion is disposed in a vehicle vertical direction lower end of the pillar upper portion.

In the vehicle pillar structure of the third aspect of the disclosure, the pillar upper portion is hollow. Furthermore, the bottom portion is disposed in the vehicle vertical direction lower end of the pillar upper portion. For this reason, according to the present disclosure, the rigidity of the pillar upper portion can be enhanced compared to a case where the lower end of the pillar upper portion is open.

A vehicle pillar structure of a fourth aspect of the disclosure is the third aspect, wherein a bearing surface to which the bottom portion is joined is disposed in the pillar lower portion.

In the vehicle pillar structure of the fourth aspect of the disclosure, the bearing surface to which the bottom portion of the pillar upper portion is joined is disposed in the pillar lower portion, so by joining the bottom portion of the pillar upper portion to the bearing surface, the joint surface area can be increased between the pillar upper portion and the pillar lower portion.

A vehicle pillar structure of a fifth aspect of the disclosure is any one of the first to fourth aspects, wherein the joint portion on the pillar upper portion side is made of carbon fiber-reinforced plastic.

In the present disclosure, the pillar upper portion is made of a transparent resin, so the joint portion between the pillar upper portion and the pillar lower portion is visible through the pillar upper portion. However, carbon fiber is colored in general, so since the joint portion on the pillar upper portion side is made of carbon fiber-reinforced plastic in the vehicle pillar structure of the fifth aspect of the disclosure, it can be ensured that the joint portion between the pillar upper portion and the pillar lower portion cannot be seen through the pillar upper portion.

According to the vehicle pillar structure of the first aspect of the disclosure, the first aspect has the superior effect that the strength and rigidity needed at the time of a side impact to the vehicle can be efficiently obtained in the joint portion between the pillar upper portion and the pillar lower portion while enhancing the ability to see outside the vehicle.

According to the vehicle pillar structure of the second aspect of the disclosure, the second aspect has the superior effect that attachability can be enhanced, a deficiency in the applied amount of adhesive can be prevented or controlled, and joint strength between the pillar upper portion and the pillar lower portion can be ensured.

According to the vehicle pillar structure of the third aspect of the disclosure, the third aspect has the superior effect that the rigidity of the pillar upper portion itself can be enhanced and the load transmission efficiency can be enhanced.

According to the vehicle pillar structure of the fourth aspect of the disclosure, the fourth aspect has the superior effect that the joint surface area can be increased between the pillar upper portion and the pillar lower portion and the joint strength between the pillar upper portion and the pillar lower portion can be enhanced.

According to the vehicle pillar structure of the fifth aspect of the disclosure, the fifth aspect has the superior effect that design attractiveness can be enhanced by ensuring that the joint portion between the pillar upper portion and the pillar lower portion cannot be seen through the pillar upper portion.

BRIEF DESCRIPTION OF THE DRAWINGS

Exemplary embodiments of the present disclosure will be described in detail based on the following figures, wherein:

FIG. 7 is a sectional view, corresponding to FIG. 4, showing a pillar upper portion and a pillar lower portion of a vehicle pillar structure according to a second embodiment;

FIG. 8 is an exploded perspective view, corresponding to FIG. 5, showing the pillar upper portion and the pillar lower portion to which the vehicle pillar structure according to the second embodiment; and FIG. 9 is a perspective view, corresponding to FIG. 6, showing a state in which the pillar upper portion is joined to the pillar lower portion, according to the second embodiment.

DETAILED DESCRIPTION

Figure 1:
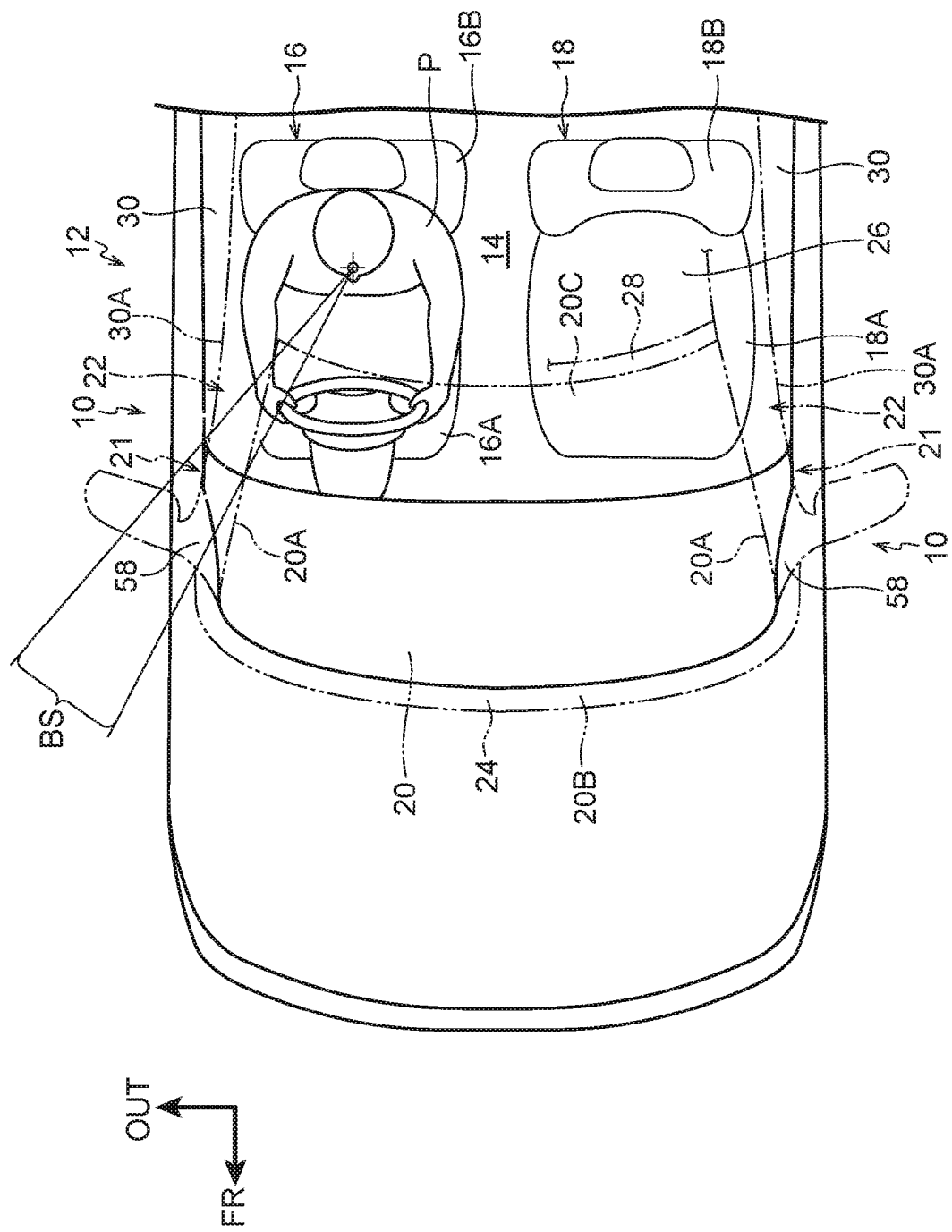
FIG. 1 is a schematic plan view showing the front portion of a cabin interior of a vehicle including a vehicle pillar structure according to a first embodiment.

In a vehicle pillar structure in accordance with some embodiments, a pillar upper portion is joined to a pillar lower portion such that the height of an outer joint portion positioned on the vehicle width direction outer side and the height of an inner joint portion positioned on the vehicle width direction inner side are different. Compared to other approaches where it is difficult in some circumstances to ensure that the joint portion between the pillar upper portion and the pillar lower portion has the strength and rigidity needed at the time of a side impact to the vehicle, some embodiments provide a vehicle pillar structure with which the strength and rigidity needed at the time of a side impact to the vehicle can be efficiently obtained in a joint portion between the pillar upper portion and the pillar lower portion while enhancing the ability to see outside the vehicle.

A vehicle pillar structure 10 according to embodiments will be described below using the drawings. Arrow FR appropriately shown in the drawings indicates a vehicle forward direction of an automobile (vehicle) 12 including the vehicle pillar structure 10, arrow UP indicates a vehicle upward direction, and arrow OUT indicates an outward direction in a vehicle width direction. Furthermore, when description is given simply using the directions of front/rear, upper/lower, and right/left, unless otherwise specified these will be understood to mean front/rear in the vehicle forward and rearward direction, upper/lower in the vehicle height direction, and right/left in the vehicle rightward and leftward direction (the vehicle width direction).

First Embodiment (Configuration of Vehicle Pillar Structure)

First, the general configuration of the vehicle 12 to which the vehicle pillar structure 10 according to one or more embodiments will be described. In FIG. 1 the front portion of a cabin 14 interior in the vehicle 12 is shown by way of a schematic plan view. As shown in this drawing, the vehicle 12 is a right-hand-drive vehicle, and a vehicle seat 16 for a driver's seat is disposed in the right side portion of the front portion of the cabin 14.

The vehicle seat 16 includes a seat cushion 16A, on which an occupant P (hereinafter "the driver P") sits, and a seat back 16B, which supports the back of the driver P. The lower end portion of the seat back 16B is connected to the rear end portion of the seat cushion 16A. Furthermore, a vehicle seat 18 for a front passenger seat is disposed in the left side portion of the front portion of the cabin 14. The vehicle seat 18 is, like the vehicle seat 16, includes a seat cushion 18A and a seat back 18B.

Figure 2:
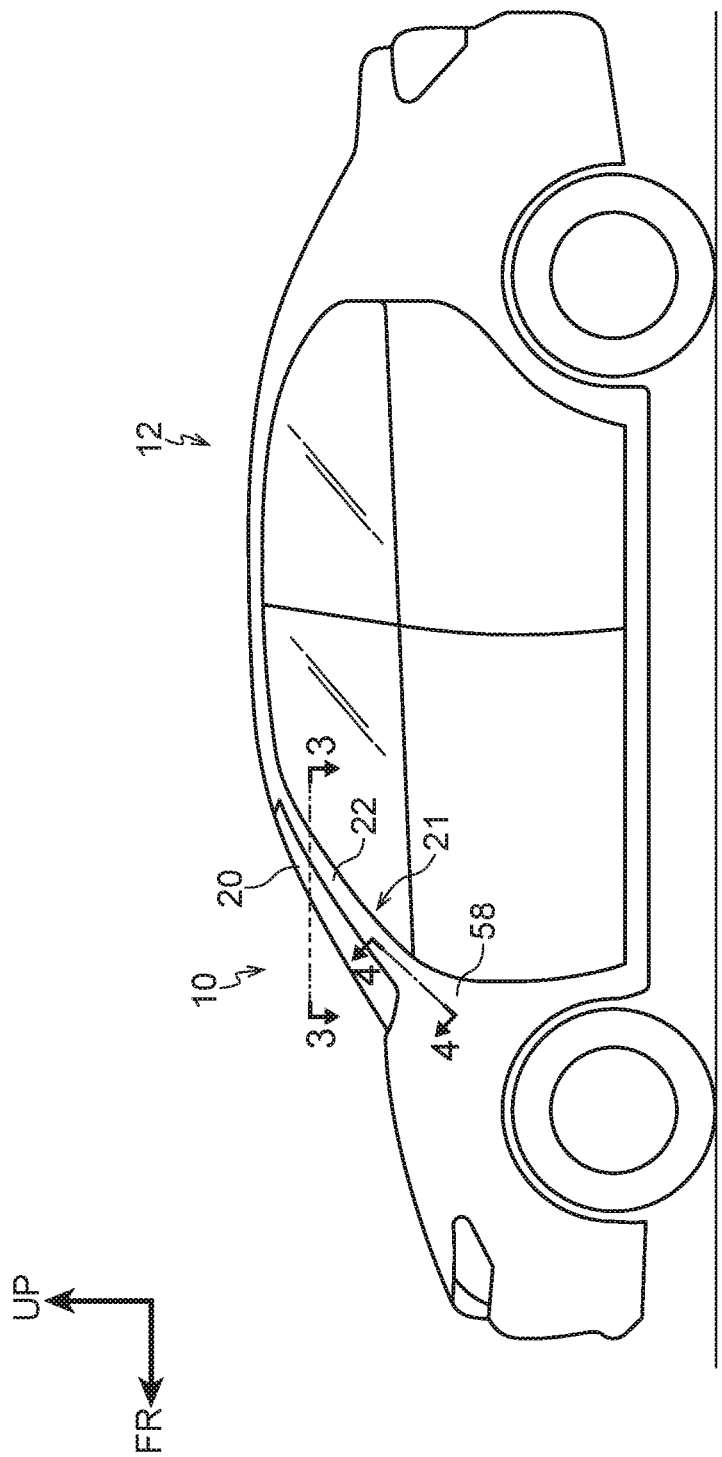
FIG. 2 is a side view showing, as seen from the left side, the entire vehicle including the vehicle pillar structure according to the first embodiment.

Furthermore, a windshield glass 20 is disposed in the front end portion of the cabin 14 of the vehicle 12. The windshield glass 20 is formed as a transparent plate and, as shown in FIG. 2, is placed sloping rearward heading upward as seen in a vehicle side view. As shown in FIG. 1, the windshield glass 20 is formed in a curved shape whose vehicle width direction center portion swells a little forward. Vehicle width direction outer end portions 20A of the windshield glass 20 are held in later-described pillar upper portions 22 configuring upper portion sides of front pillars 21.

A lower end portion 20B of the windshield glass 20 is secured by an adhesive shown in the drawings) to a cowl 24 extending along the vehicle width direction. The cowl 24 is made of, e.g., metal, and is disposed along the upper end portion of a dash panel (not shown in the drawings) configuring the front portion of the cabin 14. Furthermore, an upper end portion 20C of the windshield glass 20 is secured by an adhesive (not shown in the drawings) to a front header 28 disposed along the vehicle width direction on the front end portion of a roof 26 configuring the upper portion of the cabin 14.

Furthermore, transparent plate-like side door glasses 30 are disposed on the side portions of the cabin 14. Additionally, the pillar upper portions 22 are disposed between front end portions 30A of the side door glasses 30 and the vehicle width direction outer end portions 20A of the windshield glass 20. The pillar upper portions 22 are disposed as a pair on both sides of the windshield glass 20 in the vehicle width direction.

Here, in this embodiment, the pillar upper portions 22 are made of a transparent material, for example, the pillar upper portions 22 are made of a transparent resin such as polycarbonate. The pillar upper portions 22, as mentioned above, extend along the vehicle width direction outer end portions 20A of the windshield glass 20. For this reason, the pillar upper portions 22 are placed sloping rearward heading upward as seen in a vehicle side view and are placed obliquely to the right and left and in front as seen from the position of the driver P. With respect to the pillar upper portion in the present disclosure, "made of a transparent material" include one or more embodiments where the entire pillar upper portion is made of a transparent material, and one or more embodiments where a part of the pillar upper portion is made of a transparent material and another part of the pillar upper portion is made of another material that is colored. Likewise, with respect to the pillar upper portion in the present disclosure, "made of a transparent resin" include one or more embodiments where the entire pillar upper portion is made of a transparent resin, and one or more embodiments where a part of the pillar upper portion is made of a transparent resin and another part of the pillar upper portion is made of another material that is colored.

Figure 3:
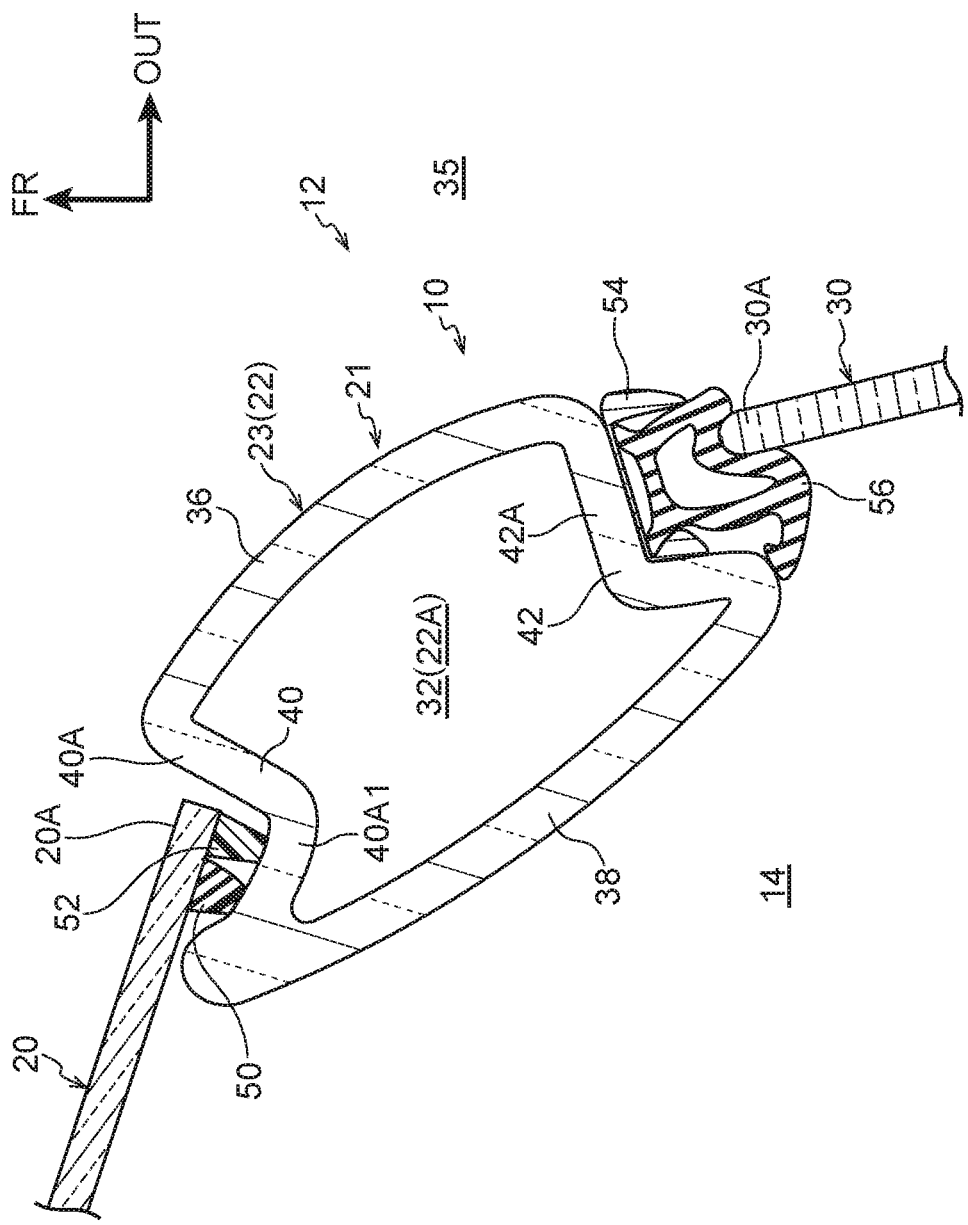
FIG. 3 is a sectional view showing a state in which a front pillar on the right side as seen from the position of a driver has been cut along line 3-3 in FIG. 2.
Figure 4:
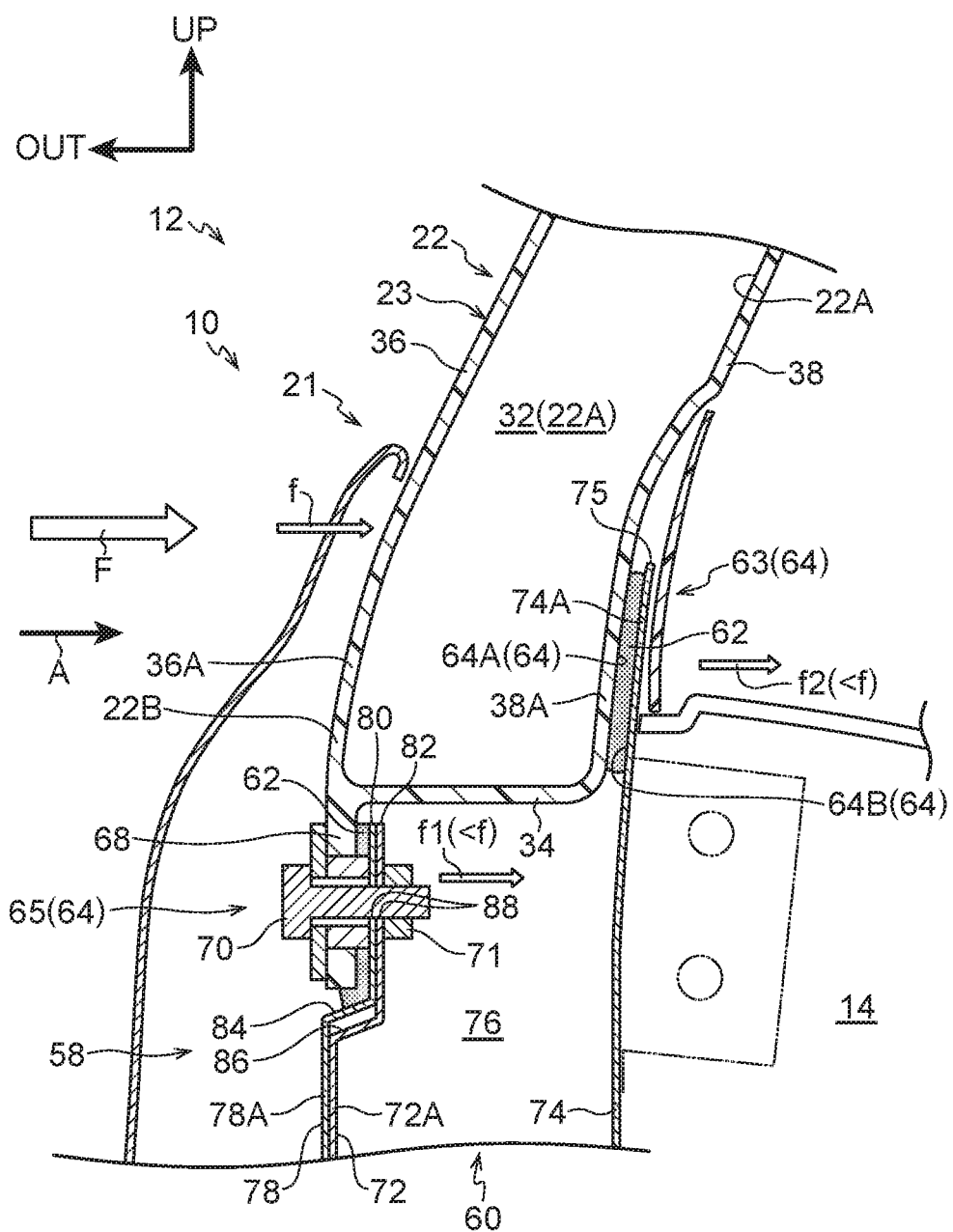
FIG. 4 is a sectional view showing a state in which a front pillar on the left side as seen from the position of the driver has been cut along line 4-4 in FIG. 2.

FIG. 3 is a sectional view, cut along line 3-3 in FIG. 2, of the front pillar 21 on the vehicle right side. FIG. 4 is a sectional view, cut along line 4-4 in FIG. 2, of the front pillar 21 on the vehicle left side. As shown in these drawings, the pillar upper portions 22 configuring the upper portion sides of the front pillars 21 each have a hollow structure having a hollow portion 22A running along the longitudinal direction of the pillar upper portions 22.

As shown in FIG. 3, a pillar upper portion body 23 configuring substantially the entire pillar upper portion 22 includes an outer wall 36, which configures a wall portion on an outside 35 of the vehicle, and an inner wall 38, which configures a wall portion on a side of the cabin 14. Additionally, the outer wall 36 and the inner wall 38 are placed opposing each other substantially in the vehicle width direction. Furthermore, the pillar upper portion body 23 has a pair of side walls 40 and 42 interconnecting the outer wall 36 and the inner wall 38. The pair of side walls 40 and 42 are placed opposing each other substantially in the vehicle forward and rearward direction.

Additionally, a holding portion 40A for holding the windshield glass 20 is formed in the side wall 40. The holding portion 40A is formed in a substantially inverted L shape that opens forward and inward in the vehicle width direction as seen in a plan sectional view in FIG. 3. The holding portion 40A projects inside a closed cross section portion 32 of the hollow portion 22A of the pillar upper portion body 23, relative to the vehicle width direction inner ends of the outer wall 36 and the inner wall 38. Furthermore, the wall portion of the holding portion 40A connected to the inner wall 38 is a holding wall 40A1 that holds the windshield glass 20. The holding wall 40A1 is placed with its plate thickness direction coinciding substantially with the forward and rearward direction as seen in a plan sectional view in FIG. 3.

An adhesive 50 is applied to the front surface of the holding wall 40A1, and the vehicle width direction outer end portion 20A of the windshield glass 20 is held via the adhesive 50 on the front surface of the holding wall 40A1. Moreover, a seal 52 is disposed between the vehicle width direction outer end portion 20A of the windshield glass 20 and the holding wall 40A1 in a position on the vehicle width direction outer side of the adhesive 50. Additionally, a gap between the windshield glass 20 and the holding wall 40A1 is sealed by the seal 52.

A holding portion 42A is formed in the side wall 42 on the vehicle width direction outer side (in other words, on the side of the side door glass 30) of the pillar upper portion body 23. The holding portion 42A is formed in a substantially L shape that opens rearward and outward in the vehicle width direction as seen in a plan sectional view in FIG. 3. The holding portion 42A projects inside the closed cross section portion 32 of the pillar upper portion body relative to the vehicle width direction outer ends of the outer wall 36 and the inner wall 38.

Furthermore, a retainer 54 formed by bending a strip of stainless steel, for example, is disposed in the holding portion 42A. The retainer 54 is formed in a substantially U shape that opens outward in the vehicle width direction and rearward as seen in a plan sectional view in FIG. 3. Additionally, the bottom wall of the retainer 54 is secured by fastening members such as screws (not shown in the drawings) to the wall portion of the holding portion 42A connected to the outer wall 36, and a door seal 56 is attached to the retainer 54. Because of this, the door seal 56 is held on the holding portion 42A via the retainer 54, and the front end portion 30A of the side door glass 30 is held in the holding portion 42A via the door seal 56.

Figure 5:
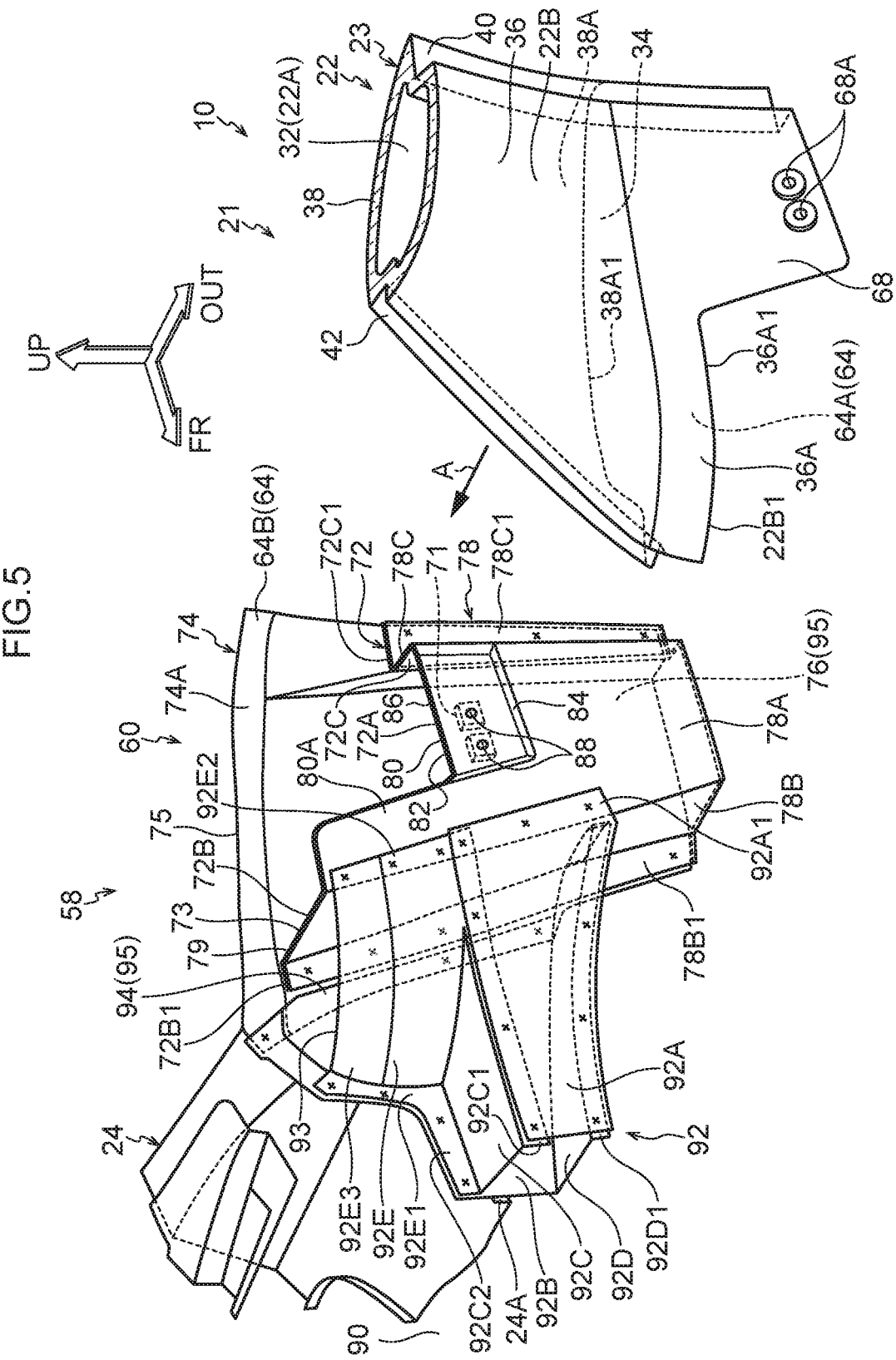
FIG. 5 is an exploded perspective view showing a pillar upper portion and a pillar lower portion of the vehicle pillar structure according to the first embodiment.

In this embodiment, as shown in FIG. 5, in the pillar upper portion 22 the hollow portion 22A of the pillar upper portion body 23 configures the closed cross section portion 32 whose longitudinal direction coincides with a direction substantially along the vehicle forward and rearward direction as seen in a plan sectional view in FIG. 3. The closed cross section portion 32 is formed in such a way that its surface area gradually becomes larger heading toward the lower side of the pillar upper portion body 23. Additionally, as shown in FIG. 4, a bottom portion 34 that closes off the hollow portion 22A is at the lower end of the pillar upper portion body 23.

Here, a joint portion 64, serving as the main portion of the vehicle pillar structure 10 according to this embodiment, between the pillar upper portion 22 configuring the upper portion side of the front pillar 21 and a pillar lower portion 58 configuring the lower portion side of the front pillar 21 will be described. The joint portion 64 includes a joint portion 64A on the pillar upper portion 22 and a joint portion 64B on the pillar lower portion 58. Furthermore, here, although the front pillar 21 on the vehicle left side is shown in the drawings, in the front pillar 21 on the vehicle right side also, the joint portion 64 is substantially the same.

Figure 6:
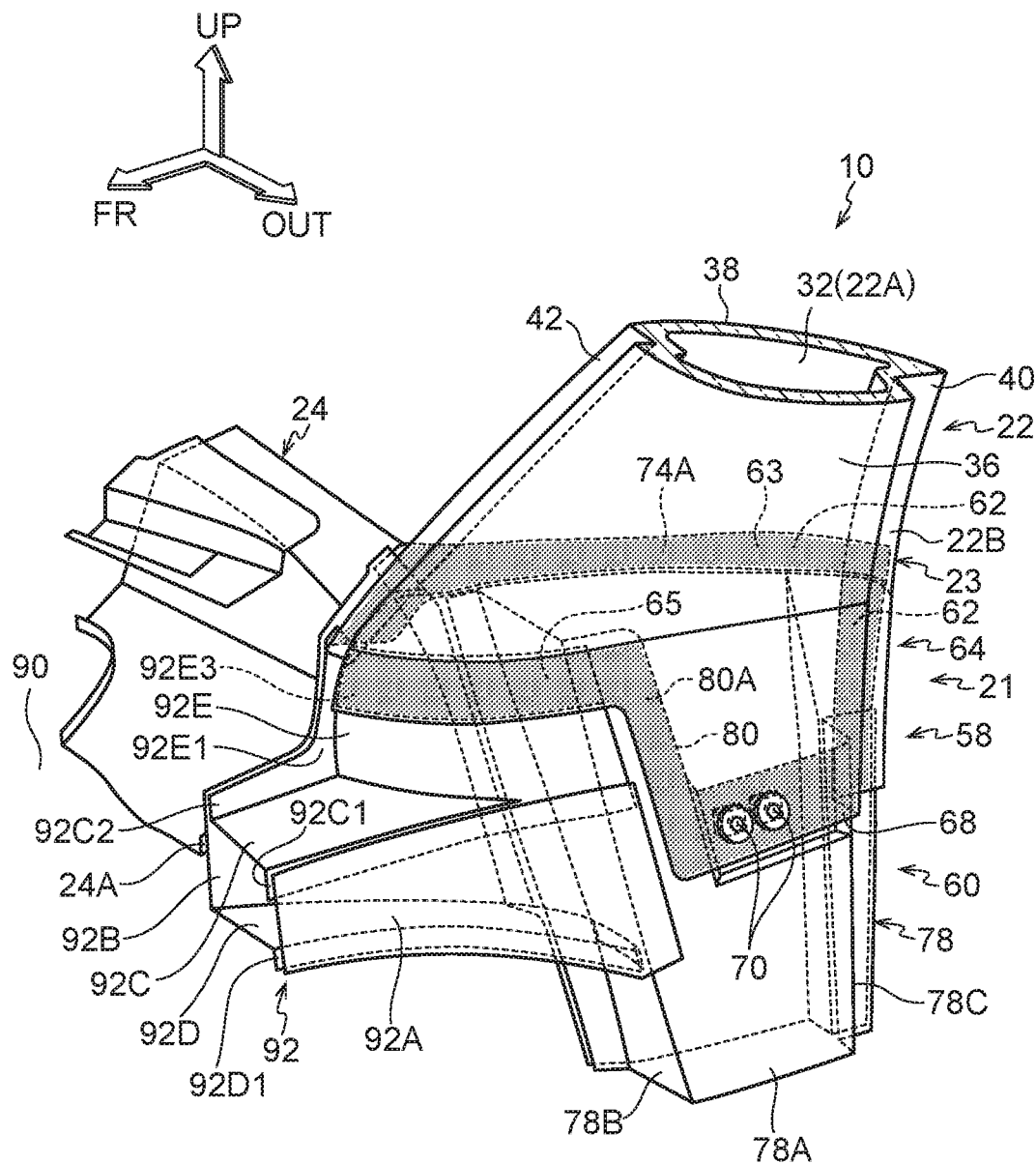
FIG. 6 is a perspective view showing a state in which the pillar upper portion is joined to the pillar lower portion, according to the first embodiment.

As shown in FIG. 4 and FIG. 6, in this embodiment a lower end portion 22B of the pillar upper portion 22 is joined via an adhesive 62 to the pillar lower portion 58. In FIG. 6, the joint portion 64 is indicated by dots (i.e., the gray shading in FIG. 6). Furthermore, the pillar lower portion 58 is mainly configured by a front pillar lower member (hereinafter "pillar lower member") 60 and is made of a highly rigid material, for example, metal, because the external force input thereto from the road surface during vehicle travel is relatively large.

Furthermore, as shown in FIG. 5, in this embodiment, at a lower end 22B1 of the pillar upper portion 22, a lower end 36A1 of the outer wall 36 extends in the downward direction beyond a lower end 38A1 of the inner wall 38. Here, the pillar upper portion 22 includes the pillar upper portion body 23, which configures substantially the entire pillar upper portion 22, and a flange portion 68. The flange portion 68 extends downward from the rear portion side of the lower end 36A1 of the outer wall 36 of the pillar upper portion body 23.

The flange portion 68 of the pillar upper portion 22 has a substantially rectangular shape as seen in a vehicle side view in FIG. 4. A pair of holes 68A (see FIG. 5) are formed along the vehicle forward and rearward direction in the lower end side of the flange portion 68. Bolts 70 (see FIG. 4) are passable through the holes 68A.

The pillar lower member 60 configuring the pillar lower portion 58 includes a front pillar outer lower member (hereinafter "pillar outer lower member") 72 placed on the vehicle width direction outer side and a front pillar inner lower member (hereinafter "pillar inner lower member") 74 placed on the vehicle width direction inner side of the pillar outer lower member 72.

The cross sectional shape of the pillar outer lower member 72 as cut substantially along the horizontal direction is a substantially hat shape that opens inward in the vehicle width direction. Additionally, the pillar outer lower member 72 includes an outer wall 72A configuring a wall portion on the vehicle width direction outer side, a front wall 72B configuring a wall portion on the vehicle forward and rearward direction front side, and a rear wall 72C configuring a wall portion on the vehicle forward and rearward direction rear side. Additionally, a front flange portion 72B1 projects forward from the vehicle width direction inner end of the front wall 72B, and a rear flange portion 71C1 projects rearward from the vehicle width direction inner end of the rear wall 72C.

The pillar inner lower member 74 has a substantially flat plate shape. The pillar inner lower member 74 is placed opposing the outer wall 72A of the pillar outer lower member 72. The front flange portion 72B1 and the rear flange portion 72C1 of the pillar outer lower member 72 are joined by welding, for example, to the pillar inner lower member 74. Hereinafter, joining by means of welding is referred to as "weld-joining" in order to distinguish it from joining by means of an adhesive or the like, and joint portions resulting from welding are indicated by "x" symbols (see FIG. 5 and FIG. 8).

The pillar inner lower member 74 and the pillar outer lower member 72 are weld-joined to each other, and thus a closed cross section portion 76 is configured between the pillar inner lower member 74 and the pillar outer lower member 72. An upper end 75 of the pillar inner lower member 74 projects upward beyond an upper end 73 of the pillar outer lower member 72.

Furthermore, a side outer panel 78 made of, e.g., metal, is disposed on the vehicle width direction outer side of the pillar outer lower member 72 so as to cover the pillar outer lower member 72. The side outer panel 78, like the pillar lower member 60, makes up part of the pillar lower portion 58.

The side outer panel 78 is configured to include an outer wall 78A, a front wall 78B, a rear wall 78C, a front flange portion 78B1, and a rear flange portion 78C1 that lie on top of the outer wall 72A, the front wall 72B, the rear wall 72C, the front flange portion 72B1, and the rear flange portion 72C1, respectively, of the pillar outer lower member 72. Additionally, an upper end 79 of the side outer panel 78 is at substantially the same height as the upper end 73 of the pillar outer lower member 72.

Furthermore, in the rear portions of the outer wall 78A of the side outer panel 78 and the outer wall 72A of the pillar outer lower member 72, cutout portions 80 and 82 having substantially L shapes as seen in a vehicle side view are formed in the upper portions of the outer walls 78A and 72A, respectively. The cutout portions 80 and 82 are formed in regions including the rear wall 78C and the rear flange portion 78C1 of the side outer panel 78 and the outer wall 72A and the rear flange portion 72C1 of the pillar outer lower member 72, respectively.

Furthermore, as shown in FIG. 4, the upper portions of the outer wall 78A of the side outer panel 78 and the outer wall 72A of the pillar outer lower member 72 are located in a position coinciding with the lower end side of the flange portion 68 of the pillar upper portion 22. In this position, recessed portions 84 and 86 that have substantially rectangular shapes as seen in a vehicle side view and are recessed inward in the vehicle width direction are formed in the outer wall 78A and the outer wall 72A, respectively.

A pair of holes 88 are formed along the vehicle forward and rearward direction in the recessed portions 84 and 86, and the bolts 70 are passable through the holes 88. Weld nuts 71 are disposed on the outer wall 72A of the pillar outer lower member 72, and the bolts 70 are screwable into the weld nuts 71. The recessed portions 84 and 86 are omitted in some embodiments.

As shown in FIG. 5, on a side of the pillar lower portion 58, an apron upper member 92 is weld-joined to the front side of the pillar lower member 60. The apron upper member 92 is disposed along the vehicle forward and rearward direction on the vehicle width direction outer side of the inside of a power unit compartment 90 disposed in the vehicle front portion.

The cross sectional shape of the apron upper member 92 as cut along the vehicle height direction and the vehicle width direction is a substantially rectangular shape, and the apron upper member 92 has a closed cross-sectional structure. Additionally, the apron upper member 92 includes, for example, an outer wall 92A, which configures a wall portion on the vehicle width direction outer side, and an inner wall 92B, which opposes the outer wall 92A and configures a wall portion on the vehicle width direction inner side.

Furthermore, the apron upper member 92 also includes an upper wall 92C, which configures a wall portion on the vehicle height direction upper side, and a lower wall 92D, which opposes the upper wall 92C and configures a wall portion on the vehicle height direction lower side. The lower wall 92D and the inner wall 92B are configured by bending a single panel.

That is, the apron upper member 92 is configured by three panels, and the outer wall 92A is weld-joined to vehicle width direction outer end portions 92C1 and 92D1 of the upper wall 92C and the lower wall 92D of the apron upper member 92. Additionally, a rear end portion 92A1 of the outer wall 92A is weld-joined to the outer wall 78A configuring the vehicle width direction outer side of the side outer panel 78. Furthermore, a vehicle width direction inner end portion 92C2 of the upper wall 92C is weld-joined to the inner wall 92B. Additionally, the vehicle width direction inner side of the inner wall 92B is weld-joined to a vehicle width direction outer end portion 24A of the cowl 24 made of, e.g., metal.

Although in this embodiment, the outer wall 92A, the inner wall 92B, the upper wall 92C, and the lower wall 92D of the apron upper member 92 are configured by three panels, other arrangements are within the scope of various embodiments, provided that a closed cross-sectional structure is formed. For example, the closed cross-sectional structure is formed in one or more embodiments by weld-joining four panels to each other (see FIG. 8).

Furthermore, a vertical wall portion 92E extends upright from the rear end of the upper wall 92C of the apron upper member 92, and the position of an upper end 93 of the vertical wall portion 92E is formed in alignment with the position of the upper end 73 of the pillar outer lower member 72. That is, the upper end 93 of the vertical wall portion 92E is placed lower than the upper end 75 of the pillar inner lower member 74.

Furthermore, the vertical wall portion 92E curves, e.g., in a circular arc shape, rearward heading outward in the vehicle width direction, and a vehicle width direction inner end portion 92E1 of the vertical wall portion 92E is formed continuously with the inner end portion 92C2 of the upper wall 92C and is weld-joined to the inner wall 92B. Furthermore, a vehicle width direction outer end portion 92E2 of the vertical wall portion 92E is weld-joined to the outer wall 78A of the side outer panel 78.

That is, here, on a side of the pillar lower portion 58, a closed cross section portion 94 is configured between the front wall 78B configuring the vehicle forward and rearward direction front side of the side outer panel 78 and the vertical wall portion 92E of the apron upper member 92. Additionally, the closed cross section portion 94 and the closed cross section portion 76 formed between the pillar inner lower member 74 and the pillar outer lower member 72 become integrated in the vehicle forward and rearward direction and form a closed cross section portion 95.

Here, the vehicle width direction inner side of a lower end portion 38A (part of the joint portion 64A on the pillar upper portion side) of the inner wall 38 of the pillar upper portion 22 is abuttable against the vehicle width direction outer side of an upper end portion 74A (part of the joint portion 64B on the pillar lower portion side) of the pillar inner lower member 74. Additionally, the adhesive 62 is applied to the upper end portion 74A of the pillar inner lower member 74 (see FIG. 6). The lower end portion 38A of the inner wall 38 of the pillar upper portion 22 is joined via the adhesive 62 to the upper end portion 74A of the pillar inner lower member 74 to thereby form an inner joint portion 63.

Furthermore, the vehicle width direction inner side of a lower end portion 36A (part of the joint portion 64A on the pillar upper portion side) of the outer wall 36 of the pillar upper portion 22 is abuttable against the front side of an upper end portion 92E3 (part of the joint portion 64B on the pillar lower portion side) of the vertical wall portion 92E of the apron upper member 92. Additionally, the adhesive 62 is applied to the upper end portion 92E3 of the vertical wall portion 92E of the apron upper member 92 (see FIG. 6). The lower end portion 36A of the outer wall 36 of the pillar upper portion 22 is joined via the adhesive 62 to the upper end portion 92E3 of the apron upper member 92 to thereby form a part of an outer joint portion 65.

Moreover, the vehicle width direction inner side of the flange portion 68 (part of the joint portion 64A on the pillar upper portion side) of the pillar upper portion 22 is abuttable against the vehicle width direction outer side of a peripheral edge portion 80A (part of the joint portion 64B on the pillar lower portion side) of the cutout portion 80 of the side outer panel 78. Additionally, the adhesive 62 is applied to the peripheral edge portion 80A of the cutout portion 80 of the side outer panel 78 (see FIG. 6). The outer wall 36 of the pillar upper portion 22 is joined via the adhesive 62 to the peripheral edge portion 80A of the cutout portion 80 of the side outer panel 78 to thereby form another part of the outer joint portion 65.

That is, the joint portion 64A on the side of the pillar upper portion 22 is configured by the lower end portion 38A of the inner wall 38, the lower end portion 36A of the outer wall 36, and the flange portion 68. Furthermore, the joint portion 64B on the side of the pillar lower portion 58 is configured by the upper end portion 74A of the pillar inner lower member 74, the upper end portion 92E3 of the vertical wall portion 92E of the apron upper member 92, and the peripheral edge portion 80A of the cutout portion 80 of the side outer panel 78.

Additionally, here, the joint portion between the lower end portion 38A of the inner wall 38 of the pillar upper portion 22 and the upper end portion 74A of the pillar inner lower member 74 is the inner joint portion 63. Furthermore, the joint portion between the lower end portion 36A of the outer wall 36 of the pillar upper portion 22 and the upper end portion 92E3 of the vertical wall portion 92E of the apron upper member 92 and the joint portion between the flange portion 68 of the pillar upper portion 22 and the peripheral edge portion 80A of the cutout portion 80 of the side outer panel 78 are the outer joint portion 65.

Furthermore, in the pillar lower portion 58, the upper end portion 74A of the pillar inner lower member 74 positioned on the vehicle width direction inner side is placed higher than the upper end portion 92E3 of the vertical wall portion 92E of the apron upper member 92 and the peripheral edge portion 80A of the cutout portion 80 of the side outer panel 78 positioned on the vehicle width direction outer side.

That is, with respect to the height of the joint portion 64 between the pillar upper portion 22 and the pillar lower portion 58, the inner joint portion 63 is disposed higher than the outer joint portion 65. Additionally, in the pillar lower portion 58, the upper end portion 74A of the pillar inner lower member 74, the upper end portion 92E3 of the vertical wall portion 92E of the apron upper member 92, and the peripheral edge portion 80A of the cutout portion 80 of the side outer panel 78 are configured in such a way that they do not coincide with each other as seen in a vehicle side view.

Furthermore, in this embodiment, in the joint portion 64 between the pillar upper portion 22 and the pillar lower portion 58, on the side of the pillar upper portion 22, the joint portion 64A is provided by the lower end portion 22B of the pillar upper portion 22 including the flange portion 68. That is, on the side of the pillar upper portion 22, the joint portion 64A is formed substantially continuously following the shape of the pillar upper portion 22 including the inner surface side and the outer surface side of the pillar upper portion 22, and the joint portion 64A is formed in a curved shape while undergoing a smooth and gradual change. Meanwhile, on the side of the pillar lower portion 58, the joint portion 64B is provided by the pillar inner lower member 74, the apron upper member 92, and the side outer panel 78. The joint portion 64B has substantially the same shape as the joint portion 64A on the side of the pillar upper portion 22 and is formed substantially continuously.

Furthermore, the joint portion 64A in one or more embodiments is made of carbon fiber-reinforced plastic. In one or more embodiments where the bottom portion 34 is provided at the lower end of the pillar upper portion 22, the bottom portion 34 is also made of carbon fiber-reinforced plastic.

(Operation and Effects of Vehicle Pillar Structure)

Next, the operation and effects of the vehicle pillar structure 10 according to this embodiment will be described. In this embodiment described with respect to FIG. 4 to FIG. 6, the pillar upper portion 22 is made of a transparent material, e.g., resin. Usually the region where the field of vision on the obliquely tight and front side (vehicle outer side) of the driver P (see FIG. 1) is obstructed by the pillar upper portion 22 is a blind spot BS. However, in this embodiment, as mentioned above, the pillar upper portion 22 is made of a transparent material, e.g., resin, so the driver P can see things in the blind spot BS via the pillar upper portion 22. That is, according to this embodiment, the ability to see outside the vehicle beyond the pillar upper portion 22 can be enhanced. Furthermore, by using resin to make the pillar upper portion 22, the weight of the vehicle 12 can be reduced.

Furthermore, in this embodiment, in the joint portion 64 between the pillar upper portion 22 and the pillar lower portion 58, the upper end portion 74A of the pillar inner lower member 74 is placed higher than the upper end portion 92E3 of the vertical wall portion 92E of the apron upper member 92 and the peripheral edge portion 80A of the cutout portion 80 of the side outer panel 78 positioned on the vehicle width direction outer side. That is, in the joint portion 64A on the side of the pillar upper portion 22, the height of the vehicle width direction inner side (the inner joint portion 63) is higher than the height of the outer side (the outer joint portion 65), and the height of the outer joint portion 65 and the height of the inner joint portion 63 are different.

For this reason, as shown in FIG. 4, a translational force (f) acting on the front pillar 21 as a result of an impact load (F) input to the vehicle side portion by a side impact to the vehicle 12 is, at the joint portion 64 between the pillar upper portion 22 and the pillar lower portion 58, divided above and below in the vehicle height direction by the outer joint portion 65 and the inner joint portion 63 and transmitted. That is, the translational force (f) resulting from the impact load (F) input to the front pillar 12 is dispersed into a translational force (f1) resulting from the load transmitted from the pillar upper portion 22 and the outer joint portion 65 to the pillar lower portion 58, and a translational force (f2) resulting from the load transmitted from the pillar upper portion 22 and the inner joint portion 63 to the pillar lower portion 58, and these translational forces (f1, f2) act on the joint portion 64 between the pillar upper portion 22 and the pillar lower portion 58. Consequently, the translational force (f1) acting on the outer joint portion 65 and the translational force (f2) acting on the inner joint portion 63 are each smaller than the translational force (f) acting on the front pillar 21 as a result of the side impact to the vehicle 12 (f1<f, f2<f).

By contrast, although it is not shown in the drawings, if, for example, the height of the outer joint portion and the height of the inner joint portion were the same in the joint portion between the pillar upper portion and the pillar lower portion configuring the front pillar, the translational force acting on the outer joint portion and the translational force acting on the inner joint portion would be of substantially the same magnitude as the translational force acting on the front pillar as a result of the side impact to the vehicle. In this case, considering the strength and rigidity that the joint portion would need at the time of a side impact to the vehicle, the joint portion would need to be strong and rigid enough to be able to withstand the translational force acting on the front pillar because translational forces of substantially the same magnitude as the translational force acting on the front pillar act on each of the outer joint portion and the inner joint portion of the joint portion.

In this embodiment, as mentioned above, the translational forces (f1, f2) acting on the outer joint portion 65 and the inner joint portion 63 in the joint portion 64 between the pillar upper portion 22 and the pillar lower portion 58 are each smaller than the translational force (f) acting on the front pillar 21. Consequently, in terms of the translational forces (f1, f2) that are each smaller than the translational force (f) acting on the front pillar 21, it is sufficient to configure the joint portion 64 with a strength and rigidity able to withstand those translational forces (f1, f2).

Consequently, according to the vehicle pillar structure 10 of this embodiment, the strength and rigidity needed at the time of a side impact to the vehicle 12 can be efficiently obtained in the joint portion 64 between the pillar upper portion 22 and the pillar lower portion 58 while enhancing the ability to see outside the vehicle.

Furthermore, as mentioned above, in this embodiment, in the joint portion 64A on the side of the pillar upper portion 22, the height of the inner joint portion 63 and the height of the outer joint portion 65 are different, so the translational force (f) acting on the front pillar 21 is dispersed above and below in the vehicle height direction. Because of this, the translational forces (f1, f2) acting on the inner joint portion 63 and the outer joint portion 65 each become smaller. Consequently, the bending moment heading inward in the vehicle width direction and acting starting at the joint portion 64A in the pillar upper portion 22 becomes smaller, and deformation of the pillar upper portion 22 caused by the bending moment can be controlled.

Furthermore, in this embodiment, with respect to the height of the joint portion 64 between the pillar upper portion 22 and the pillar lower portion 58, the inner joint portion 63 is disposed higher than the outer joint portion 65. For this reason, in this embodiment, even when the pillar upper portion 22 is moved from outside in the vehicle width direction inward along the direction of arrow A relative to the pillar lower portion 58 during the assembly of the vehicle 12, it can be ensured that the pillar upper portion 22 does not interfere with the pillar lower portion 58 as the pillar upper portion 22 approaches the joint portion 64 on the side of the pillar lower portion 58.

Specifically, in this embodiment, the pillar upper portion 22 shown in FIG. 4 to FIG. 6 is formed in such a way that the position of the lower end portion 36A of the outer wall 36 is lower than that of the lower end portion 38A of the inner wall 38. Furthermore, on the side of the pillar lower portion 58, the upper end portion 74A of the pillar inner lower member 74, the upper end portion 92E3 of the vertical wall portion 92E of the apron upper member 92, and the peripheral edge portion 80A of the cutout portion 80 of the side outer panel 78 are configured in such a way that they do not coincide with each other as seen in a vehicle side view. For this reason, in this embodiment, when joining the pillar upper portion 22 to the pillar lower portion 58, the pillar upper portion 22 can be joined to the pillar lower portion 58 from outside in the vehicle width direction inward.

In this way, when the pillar upper portion 22 is moved along the direction of arrow A from the vehicle width direction outer side of the pillar lower portion 58 inward during the assembly of the vehicle 12, the inner wall 38 of the pillar upper portion 22 abuts against the upper end portion 74A of the pillar inner lower member 74. Furthermore, the outer wall 36 of the pillar upper portion 22 abuts against the upper end portion 92E3 of the vertical wall portion 92E of the apron upper member 92, and the flange portion 68 of the pillar upper portion 22 abuts against the peripheral edge portion 80A of the cutout portion 80 of the side outer panel 78.

Meanwhile, on the side of the pillar lower portion 58, the adhesive 62 is applied to the upper end portion 74A of the pillar inner lower member 74, the upper end portion 92E3 of the vertical wall portion 92E of the apron upper member 92, and the peripheral edge portion 80A of the cutout portion 80 of the side outer panel 78. For this reason, the lower end portion 38A of the inner wall 38, the lower end portion 36A of the outer wall 36, and the flange portion 68 of the pillar upper portion 22 are joined via the adhesive 62 to these members. In addition, the pillar upper portion 22, the side outer panel 78, and the pillar outer lower member 72 are fastened and joined to each other via the flange portion 68 of the pillar upper portion 22 by the bolts 70 and the weld nuts 71.

Although it is not shown in the drawings, if, for example, the pillar upper portion were joined to (fitted into) the pillar lower portion from above downward, the direction in which the pillar upper portion is moved when attaching it would be a direction substantially parallel to the joint portion on the pillar lower portion side, so the pillar upper portion would slide along the vehicle height direction on the joint portion on the pillar lower portion side. Because of this, if, for example, the pillar upper portion were joined to the pillar lower portion via an adhesive, the adhesive applied to the pillar lower portion would be scraped away by the pillar upper portion. As a result, the amount of adhesive remaining on the joint portion would decrease and the joint strength between the pillar upper portion and the pillar lower portion would be reduced.

By contrast, in this embodiment, as mentioned above, when joining the pillar upper portion 22 to the pillar lower portion 58, the pillar upper portion 22 can be joined to the pillar lower portion 58 from outside in the vehicle width direction inward. In this case, the direction (the direction of arrow A) in which the pillar upper portion 22 is moved when attaching it is a direction substantially orthogonal to the joint portion 64B on the side of the pillar lower portion 58, and owing to the movement of the pillar upper portion 22 it is ensured that the pillar upper portion 22 does not interfere with the joint portion 64B on the side of the pillar lower portion 58, so sliding of the pillar upper portion 22 on the joint portion 64B on the side of the pillar lower portion 58 is controlled.

Consequently, according to this embodiment, the adhesive 62 applied to the joint portion 64B on the side of the pillar lower portion 58 can be kept from being scraped away by the pillar upper portion 22 during the assembly of the vehicle 12. That is, in this embodiment, the pillar upper portion 22 is joined to the pillar lower portion 58 from outside in the vehicle width direction inward, so attachability can be enhanced, a deficiency in the applied amount of the adhesive 62 can be prevented or controlled, and the joint strength between the pillar upper portion 22 and the pillar lower portion 58 can be ensured.

For this reason, compared to a case where the applied amount of the adhesive in the joint portion between the pillar upper portion and the pillar lower portion is deficient, in this embodiment, the strength and rigidity of the joint portion 64 between the pillar upper portion 22 and the pillar lower portion 58 can be enhanced. Because of this, the load transmission efficiency can be enhanced between the pillar upper portion 22 and the pillar lower portion 58.

Furthermore, in this embodiment, the flange portion 68 extends downward from the lower end of the rear portion of the outer wall 36 of the pillar upper portion 22, and the flange portion 68 is joined to the pillar lower portion 58. For this reason, the joint surface area needed to join the lower end portion 22B of the pillar upper portion 22 to the pillar lower portion 58 can be ensured by the flange 68 regardless of the shape of the lower end portion 22B of the pillar upper portion 22, and the joint strength between the pillar upper portion 22 and the pillar lower portion 58 can be ensured. In some embodiments, depending on the shape of the lower end portion 22B of the pillar upper portion 22, it is possible to omit the flange portion 68.

Moreover, in this embodiment, the direction (the direction of arrow A) in which the pillar upper portion 22 is moved when attaching it is a direction substantially orthogonal to the joint portion 64B on the side of the pillar lower portion 58. That is, it is ensured that the direction in which the pillar upper portion 22 is moved when attaching it to the joint portion 64B on the side of the pillar lower portion 58 does not become a direction deviating, at an acute angle, forward or rearward from the substantially orthogonal direction. Because of this, when joining the pillar upper portion 22 to the pillar lower portion 58, it can be ensured that the joint portion 64A on the side of the pillar upper portion 22 does not slide on the joint portion 64B on the side of the pillar lower portion 58. As a result, it can be ensured that the adhesive 62 is not scraped away in the joint portion 64B on the side of the pillar lower portion 58, and a deficiency in the applied amount of the adhesive 62 can be prevented or controlled.

Furthermore, in this embodiment, the bottom portion 34 that closes off the hollow portion 22A of the pillar upper portion 22 is provided at the lower end of the pillar upper portion 22. For this reason, although it is not shown in the drawings, compared to a case where the lower end of the pillar upper portion is open, the rigidity of the pillar upper portion 22 can be enhanced. For this reason, the load transmission efficiency can be enhanced between the pillar upper portion 22 and the pillar lower portion 58. However, in some embodiments, depending on the required characteristics of the pillar upper portion 22, it is possible to omit the bottom portion 34.

Furthermore, in this embodiment, the joint portion 64A on the side of the pillar upper portion 22 is made of carbon fiber-reinforced plastic in an example configuration. The pillar upper portion 22 is made of a transparent material, e.g., resin, so the joint portion 64 between the pillar upper portion 22 and the pillar lower portion 58 is visible through the pillar upper portion 22. However, carbon fiber-reinforced plastic is usually colored in one or more embodiments, so when the joint portion 64A on the side of the pillar upper portion 22 is made of carbon fiber-reinforced plastic, it can be ensured that the joint portion 64 between the pillar upper portion 22 and the pillar lower portion 58 is not visually recognizable through the pillar upper portion 22. Because of this, the design attractiveness of the vehicle including the front pillar 21 can be enhanced.

Furthermore, when the joint portion 64A on the side of the pillar upper portion 22 is made of carbon fiber-reinforced plastic, the joint portion 64A is reinforced. In some embodiments, it is not necessary for the joint portion 64A to be made of carbon fiber-reinforced plastic. For example, in some embodiments, the joint portion 64A is made of a colored resin not including carbon fiber, or glass fiber-reinforced plastic instead of carbon fiber. Moreover, in one or more embodiments, parts other than the joint portion 64A on the side of the pillar upper portion 22 are partially made of carbon fiber-reinforced plastic. Because of this, the strength and rigidity of the pillar upper portion 22 can be further enhanced.

Moreover, in this embodiment, the joint portion 64A on the side of the pillar upper portion 22 is configured by the lower end portion 38A of the inner wall 38, the lower end portion 36A of the outer wall 36, and the flange portion 68. That is, the joint portion 64A is formed while undergoing a smooth and gradual change continuously following the outer shape of the pillar upper portion 22. Meanwhile, the joint portion 64B on the side of the pillar lower portion 58 is configured by the upper end portion 74A of the pillar inner lower member 74, the upper end portion 92E3 of the vertical wall portion 92E of the apron upper member 92, and the peripheral edge portion 80A of the cutout portion 80 of the side outer panel 78. Additionally, the joint portion 64B has substantially the same shape as the joint portion 64A on the side of the pillar upper portion 22 and is continuously formed. For this reason, the strength and rigidity of the joint portion 64 between the pillar upper portion 22 and the pillar lower portion 58 can be enhanced. Because of this, the load transmission efficiency can be enhanced between the pillar upper portion 22 and the pillar lower portion 58.

Furthermore, in this embodiment, on the side of the pillar lower portion 58, the closed cross section portion 94 is formed between the front wall 78B of the side outer panel 78 and the vertical wall portion 92E of the apron upper member 92. The closed cross section portion 95 is formed by the closed cross section portion 94 and the closed cross section portion 76 formed between the pillar inner lower member 74 and the pillar outer lower member 72, and the closed cross section portion 95 has substantially the same shape as the closed cross section portion 32 formed on the side of the lower end portion 22B of the pillar upper portion 22. The closed cross section portion 95 is partitioned in the vehicle forward and rearward direction by the front wall 78B of the side outer panel 78. Because of this, the strength and rigidity of the joint portion 64 on the side of the pillar lower portion 58 can be enhanced.

Second Embodiment

Next, a second embodiment will be described with respect to FIGS. 7-9, in which the same reference signs will be assigned to parts having the same configuration and/or function and/or operation as those in FIGS. 1-5, and a detailed description of those parts (and also their function and/or operation) will be omitted.

In this embodiment, as shown in FIG. 7 to FIG. 9, a lower end of a pillar upper portion 100 configuring a front pillar 98 has a bottom portion 102 that closes off a hollow portion 100A in the pillar upper portion 100. The bottom portion 102 slopes upward heading from outside in the vehicle width direction inward.

A bearing surface 106 to which the bottom portion 102 of the pillar upper portion 100 is joined is provided on a pillar lower portion 104. The bearing surface 106 slopes upward heading from outside in the vehicle width direction inward, and the bearing surface 106 and the bottom portion 102 are substantially parallel to each other.

Specifically, the bearing surface 106 is disposed on a side outer panel 108, and the bearing surface 106 is connected to the upper ends of an outer wall 108A, a front wall 108B, and a rear wall 108C of the side outer panel 108. As in the side outer panel 108, a bearing surface 112 connected to an outer wall 110A, a front wall 110B, and a rear wall 110C of a pillar outer lower member 110 lying on top of the inner side of the side outer panel 108 is also disposed on the pillar outer lower member 110.

Furthermore, a flange portion 108D projects upward from a vehicle width direction inner end portion 106A of the bearing surface 106 of the side outer panel 108. Furthermore, a flange portion 110D projects upward from a vehicle width direction inner end portion of the bearing surface 112 of the pillar outer lower member 110, and the flange portion 108D of the side outer panel 108 is weld-joined to the flange portion 110D. Additionally, the flange portion 110D of the pillar outer lower member 110 is weld-joined to a pillar inner lower member 114.

In this embodiment, the bottom portion 102 is formed in the pillar upper portion 100, and the bearing surface 106 formed substantially parallel to the bottom portion 102 is disposed on the side of the pillar lower portion 104. Additionally, when joining the pillar upper portion 100 to the pillar lower portion 104, the bottom portion 102 of the pillar upper portion 100 can be brought into surface contact with the bearing surface 106 of the pillar lower portion 104, and the bottom portion 102 is joined at a joint portion 118 via an adhesive 116 to the bearing surface 106. Because of this, the joint surface area between the pillar upper portion 100 and the pillar lower portion 104 can be increased and the joint strength between the pillar upper portion 100 and the pillar lower portion 104 can be enhanced. In FIG. 9, a joint portion 120 is indicated by dots (i.e., the gray shading in FIG. 9).

That is, in this embodiment, in the joint portion 120 between the pillar upper portion 100 and the pillar lower portion 104, the joint plane thereof includes not only a plane along the vehicle forward and rearward direction (the outer joint portion 65 and the inner joint portion 63) but also a plane along the vehicle width direction (the joint portion 118). In this way, in the pillar upper portion 100, by disposing a plurality of joint plane directions in the joint portion 120 between the pillar upper portion 100 and the pillar lower portion 104, high joint strength can be exhibited with respect to plural input force directions.

Although in this embodiment, the bottom portion 102 of the pillar upper portion 100 slopes upward heading from outside in the vehicle width direction inward, it is not necessary in some embodiments for the bottom portion 102 to be sloped in this way. For example, the bottom portion 102 is disposed along the substantially horizontal direction in some embodiments. Furthermore, in the case of not joining the pillar upper portion 100 to the pillar lower portion 104 heading from the vehicle width direction outer side of the pillar lower portion 104 inward, although it is not shown in the drawings, the bottom portion is sloped downward heading from outside in the vehicle width direction inward in some embodiments.

Furthermore, in this embodiment, the bearing surface 106 is formed on the side of the pillar lower portion 104 in relation to the bottom portion 102 of the pillar upper portion 100, the bearing surface 106 is placed substantially parallel to the bottom portion 102, and the bottom portion 102 is joined to the bearing surface 106, but it is not necessary in some embodiments for the bearing surface 106 and the bottom portion 102 to be joined to each other. In this case, the bearing surface 106 and the bottom portion 102 do not have to be placed substantially parallel to each other.

Other Embodiments

In one or more of the preceding embodiments, for example, as shown in FIG. 4, in the front pillar 21 the pillar upper portion 22 has a hollow structure, but the pillar upper portion 22 is not limited to this and may also have a solid structure (not shown in the drawings). When the pillar upper portion has a solid structure in this way, the rigidity of the pillar upper portion becomes higher than that of a pillar upper portion having a hollow structure, but views of objects outside the vehicle become more distorted due to the refraction of light passing through the pillar upper portion.

Furthermore, in one or more of the preceding embodiments, with respect to the height of the joint portion 64 between the pillar upper portion 22 and the pillar lower portion 58, the inner joint portion 63 is disposed higher than the outer joint portion 65. However, in order to enhance the strength and rigidity of the joint portion 64, it suffices for the height of the inner joint 63 and the height of the outer joint 65 to be different in the joint portion 64 between the pillar upper portion 22 and the pillar lower portion 58, so the height of the inner joint portion 63 and the height of the outer joint portion 65 are not limited to the configuration described in one or more of the preceding embodiments. For example, the inner joint portion 63 is disposed lower than the outer joint portion 65 in the joint portion 64, in some embodiments.

Moreover, in one or more of the preceding embodiments, an example was described where the vehicle pillar structure 10 is applied to the front pillars 21 disposed in the front portion of the cabin 14, but the vehicle pillar structure 10 is applicable not only to the front pillars 21 but also to rear pillars (not shown in the drawings) disposed in the rear portion of the cabin 14.

Furthermore, in one or more of the preceding embodiments, the vehicle pillar structure 10 is applied to the right-hand-drive vehicle 12, but the vehicle pillar structure 10 is applicable to a left-hand-drive automobile in some embodiments.

Moreover, although embodiments of the disclosure have been described here, the disclosure is not limited to these embodiments. It goes without saying that the embodiments and the various example modifications may also be appropriately combined and used, and that the disclosure can be implemented in a variety of ways without departing from the spirit thereof.

What is claimed is:
1. A vehicle pillar structure, comprising:
 a pillar upper portion that extends along a vehicle height direction on a vehicle width direction outer side, and is made of a transparent resin; and a pillar lower portion that is disposed on a vehicle height direction lower side of the pillar upper portion, is made of metal, and is joined to the pillar upper portion at a joint portion, wherein the joint portion between the pillar upper portion and the pillar lower portion includes
an outer joint portion positioned along both the vehicle height direction and a vehicle forward-rearward direction on the vehicle width direction outer side, and
an inner joint portion positioned along both the vehicle height direction and the vehicle forward-rearward direction on a vehicle width direction inner side, and wherein a height of the outer joint portion is less than a height of the inner joint portion.

2. The vehicle pillar structure according to claim 1, wherein
the pillar upper portion includes a pillar upper portion body and a flange portion extending downward from a vehicle height direction lower end of the pillar upper portion body,
the pillar upper portion body is joined to the pillar lower portion at the inner joint portion, and
the flange portion is joined to the pillar lower portion at the outer joint portion.

3. The vehicle pillar structure according to claim 1, wherein the pillar upper portion is hollow, and has a bottom portion at a vehicle height direction lower end of the pillar upper portion.

4. The vehicle pillar structure according to claim 3, wherein the pillar lower portion has a bearing surface joined to the bottom portion.

5. The vehicle pillar structure according to claim 4, wherein the bearing surface slopes upward heading from outside in a vehicle width direction inward, and the bearing surface and the bottom portion are substantially parallel to each other.

6. The vehicle pillar structure according to claim 1, wherein the joint portion on a side of the pillar upper portion is made of carbon fiber-reinforced plastic.

7. The vehicle pillar structure according to claim 1, wherein
at the inner joint portion,
the pillar upper portion has a lower end overlapping the pillar lower portion in a vehicle width direction, and
the lower end of the pillar upper portion is located on the vehicle width direction outer side with respect to the pillar lower portion, and is joined to the pillar lower portion,
at the outer joint portion,
the pillar lower portion has an upper end overlapping the pillar upper portion in the vehicle width direction, and
the upper end of the pillar lower portion is located on the vehicle width direction inner side with respect to the pillar upper portion, and is joined to the pillar upper portion, and
the inner joint portion is disposed higher than the outer joint portion.

8. The vehicle pillar structure according to claim 1, wherein
at the inner joint portion,
the pillar upper portion has a lower end overlapping the pillar lower portion in a vehicle width direction, and
the lower end of the pillar upper portion is located on the vehicle width direction outer side with respect to the pillar lower portion, and is joined to the pillar lower portion,
at the outer joint portion,
the pillar lower portion has an upper end overlapping the pillar upper portion in the vehicle width direction, and
the upper end of the pillar lower portion is located on the vehicle width direction inner side with respect to the pillar upper portion, and is joined to the pillar upper portion, and
the inner joint portion is disposed lower than the outer joint portion.

9. The vehicle pillar structure according to claim 1, wherein
the pillar lower portion has a pillar inner lower member and a pillar outer lower member joined to each other,
the pillar outer lower member has a cutout portion, and
an upper edge of the cutout portion is lower than an upper edge of the pillar inner lower member for permitting the pillar upper portion to be moved, during assembly of the vehicle pillar structure, from outside in a vehicle width direction inward relative to the pillar lower portion to be joined to the pillar lower portion.

10. The vehicle pillar structure according to claim 9, wherein the inner joint portion extends along the upper edge of the pillar inner lower member and is higher than the outer joint portion that extends along the upper edge of the cutout portion.

11. A vehicle pillar structure, comprising:
a pillar upper portion that extends along a vehicle height direction on a vehicle width direction outer side, and is made of a transparent material; and
a pillar lower portion that is disposed on a vehicle height direction lower side of the pillar upper portion, and is joined to the pillar upper portion at a joint portion,
wherein the joint portion between the pillar upper portion and the pillar lower portion includes
an outer joint portion positioned along both the vehicle height direction and a vehicle forward-rearward direction on the vehicle width direction outer side, and
an inner joint portion positioned along both the vehicle height direction and the vehicle forward-rearward direction on a vehicle width direction inner side, and
wherein a height of the outer joint portion is less than a height of the inner joint portion.

12. The vehicle pillar structure according to claim 11, wherein
the pillar upper portion includes a pillar upper portion body and a flange portion extending downward from a vehicle height direction lower end of the pillar upper portion body,
the pillar upper portion body is joined to the pillar lower portion at the inner joint portion, and
the flange portion is joined to the pillar lower portion at the outer joint portion.

13. The vehicle pillar structure according to claim 11, wherein the pillar upper portion is hollow, and has a bottom portion at a vehicle height direction lower end of the pillar upper portion.

14. The vehicle pillar structure according to claim 13, wherein the pillar lower portion has a bearing surface joined to the bottom portion.

15. The vehicle pillar structure according to claim 14, wherein the bearing surface slopes upward heading from outside in a vehicle width direction inward, and the bearing surface and the bottom portion are parallel to each other.

16. The vehicle pillar structure according to claim 11, wherein the joint portion on a side of the pillar upper portion is made of carbon fiber-reinforced plastic.

17. The vehicle pillar structure according to claim 11, wherein at the inner joint portion, the pillar upper portion has a lower end overlapping the pillar lower portion in a vehicle width direction, and the lower end of the pillar upper portion is located on the vehicle width direction outer side with respect to the pillar lower portion, and is joined to the pillar lower portion, at the outer joint portion, the pillar lower portion has an upper end overlapping the pillar upper portion in the vehicle width direction, and the upper end of the pillar lower portion is located on the vehicle width direction inner side with respect to the pillar upper portion, and is joined to the pillar upper portion, and the inner joint portion is disposed higher than the outer joint portion.

18. The vehicle pillar structure according to claim 17, wherein at the inner joint portion, the pillar upper portion has a lower end overlapping the pillar lower portion in a vehicle width direction, and the lower end of the pillar upper portion is located on the vehicle width direction outer side with respect to the pillar lower portion, and is joined to the pillar lower portion, at the outer joint portion, the pillar lower portion has an upper end overlapping the pillar upper portion in the vehicle width direction, and the upper end of the pillar lower portion is located on the vehicle width direction inner side with respect to the pillar upper portion, and is joined to the pillar upper portion, and the inner joint portion is disposed lower than the outer joint portion.

19. The vehicle pillar structure according to claim 11, wherein the pillar lower portion has a pillar inner lower member and a pillar outer lower member joined to each other, the pillar outer lower member has a cutout portion, and an upper edge of the cutout portion is lower than an upper edge of the pillar inner lower member for permitting the pillar upper portion to be moved, during assembly of the vehicle pillar structure, from outside in a vehicle width direction inward relative to the pillar lower portion to be joined to the pillar lower portion.

20. The vehicle pillar structure according to claim 19, wherein the inner joint portion extends along the upper edge of the pillar inner lower member and is higher than the outer joint portion that extends along the upper edge of the cutout portion.

* * * * *